(12) United States Patent
Hsu

(10) Patent No.: US 10,730,130 B2
(45) Date of Patent: Aug. 4, 2020

(54) FIELD FORMER FOR USE IN WELDING APPLICATIONS

(71) Applicant: Illinois Tool Works Inc., Glenview, IL (US)

(72) Inventor: Christopher Hsu, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 668 days.

(21) Appl. No.: 15/270,510

(22) Filed: Sep. 20, 2016

(65) Prior Publication Data

US 2018/0079022 A1 Mar. 22, 2018

(51) Int. Cl.
*B23K 9/08* (2006.01)
*B23K 9/29* (2006.01)
*B23K 9/173* (2006.01)
*B23K 9/073* (2006.01)

(52) U.S. Cl.
CPC .............. *B23K 9/08* (2013.01); *B23K 9/0737* (2013.01); *B23K 9/173* (2013.01); *B23K 9/295* (2013.01)

(58) Field of Classification Search
CPC ........... B23K 9/08; B23K 9/0737; B23K 9/10
USPC ................ 219/73.1, 76.17, 98, 99, 123, 126
See application file for complete search history.

(56) References Cited

U.S. PATENT DOCUMENTS

| | | | | |
|---|---|---|---|---|
| 1,851,479 | A | * | 3/1932 | Andren ................ B23K 9/0737 219/123 |
| 1,906,496 | A | * | 5/1933 | Stine .................... B23K 9/0737 219/137 R |
| 3,584,181 | A | | 6/1971 | Nemoto |
| 4,027,135 | A | | 5/1977 | Barger |
| 4,125,758 | A | * | 11/1978 | Oishi ................... B23K 9/0209 219/126 |
| 6,069,334 | A | * | 5/2000 | Capitanescu ............ B23K 9/04 219/123 |
| 6,723,945 | B2 | | 4/2004 | Kurz |
| 7,045,741 | B2 | | 5/2006 | Schmitt |
| 7,235,758 | B2 | | 6/2007 | Ignatchenko et al. |
| 7,647,681 | B1 | | 1/2010 | Harris et al. |

(Continued)

FOREIGN PATENT DOCUMENTS

CA 921568 2/1973
CN 101143401 * 3/2008

(Continued)

OTHER PUBLICATIONS

PCT, Notification of Transmittal of the International Search Report and the Written Opinion of the International Searching Authority, or the Declaration, in Application No. PCT/US2017/052173, dated Jan. 25, 2018 (11 pages).

(Continued)

*Primary Examiner* — Thien S Tran
(74) *Attorney, Agent, or Firm* — McAndrews, Held & Malloy, Ltd.

(57) ABSTRACT

Apparatuses, systems, and/or methods relate to a welding system that provides a field former for use in welding applications. The welding system includes a welding torch that includes one or more coil windings through which flows current that forms a magnetic field. The magnetic field is concentric to the tool center point. An arc is formed between the electrode and a workpiece. The magnetic field forces the arc in a center of the welding torch or the one or more coiled windings.

29 Claims, 3 Drawing Sheets

(56) References Cited

U.S. PATENT DOCUMENTS

| | | | |
|---|---|---|---|
| 9,511,441 B2 | 12/2016 | Cole et al. | |
| 2010/0038345 A1* | 2/2010 | Nishimura | B23K 9/123 219/74 |
| 2012/0152921 A1 | 6/2012 | Peters et al. | |
| 2014/0001168 A1 | 1/2014 | Cole | |

FOREIGN PATENT DOCUMENTS

| | | | |
|---|---|---|---|
| CN | 202824954 | | 3/2013 |
| DE | 29807894 | * | 7/1998 |
| EP | 0167150 | | 1/1986 |
| EP | 2987580 | | 2/2016 |
| EP | 2987580 A1 | | 2/2016 |

OTHER PUBLICATIONS

European Office Action Appln No. 17777730.7 dated Jun. 4, 2020 (4 pgs).

* cited by examiner

FIELD FORMER FOR USE IN WELDING APPLICATIONS

BACKGROUND

Arc blow is the deflection of a welding arc from its normal path due to magnetic forces. This condition is usually encountered in direct current welding of magnetic materials, such as iron, nickel, and their alloys. Arc blow mostly in DC welding, but can happen in alternating current welding under certain conditions, but these cases can be rare and the intensity of the arc blow is less severe. Direct current flowing through the electrode and base metal sets up a magnetic field around the electrode. The magnetic field tends to deflect the arc to the side at times, but the arc can deflect forward or backwards along the joint.

Back blow is encountered when welding toward the work cable connection on a workpiece near the end of a joint or into a corner or an edge. Forward blow is encountered when welding away from the work cable connection on a workpiece at the start of a joint. In general, arc blow can be the result of two conditions: change of current flow direction as it enters the work and is conducted toward the work cable; and asymmetric arrangement of magnetic material around the arc, a condition that can exist when welding is performed near the end of ferromagnetic materials or the workpiece and/or weld fixture has residual magnetism. Improper grounding of the workpiece can also cause arc blow.

Although arc blow cannot always be completely eliminated, what is needed is way in which to control or reduce arc blow to an acceptable level.

High current is needed to provide the melt off of the wire at high deposition. However, one problem of high current gas metal arc welding is arc instability from rotational spray arc metal transfer. To support higher current, the anode area increases such the arc climbs above the molten metal, plasticizes the wire near the molten metal and forms it into a tapered shape. The asymmetric electromagnetic Lorenz/radial pinch forces and Euler/azimuthal forces move the liquid away from its straight line of flow, and forms an unstable or unpredictable rotating liquid string tethered to the wire end with arc pressure and resulting in spiral filament motion, excessive spatter, lack of penetration, and process instability.

Further, high current for high deposition gas metal arc welding with certain shielding gas composition can suffer from finger shaped penetration due to certain energy density distribution of the arc from a round wire, heat sinking condition of the workpiece and thermodynamics of the weld puddle. The penetration profile can cause the root of the joint to be missed due to arc blow or make the part fit-up in a situation in which wire placement alignment with respect to the joint is critical. This can increase the tooling cost and part dimensional control cost to improve fit-up for a fabricator. Further, joint preparation cost (e.g., necessitating precision laser or waterjet cutting and CNC machining of the joint prior to welding) can also increase. Ultimately, weld quality can be compromised if the pre-welding operations are not controlled.

In addition, shielding gas flow may not be uniform due to turbulence, clogged gas nozzle, improper gas flow rate, out-of-position welding, and/or wind or fume exhaust that steer ionized gas plasma astray from the center of weld tool axis.

What is needed is an apparatus, system or method that keeps the arc centered and prevents the arc from straying or being disturbed for enhanced arc control, increased weld quality, and a more stable weld process.

BRIEF SUMMARY

Apparatuses, systems, and methods according to the present disclosure relate to a welding system that provides a field former for use in welding applications substantially as illustrated by and/or described in connection with at least one of the figures, as set forth more completely in the claims.

DETAILED DESCRIPTION

Some embodiments of apparatuses, systems, and methods according to the present disclosure relate to a welding system that provides a field former for use in welding applications are provided.

Some embodiments according to the present disclosure stabilize the position of the arc in the center of the welding torch or the joint center with improved immunity to external influences that cause arc wander or arc blow such as, for example, a surface oxide and a residual magnetism of the workpiece, and a disturbance to the shielding gas flow.

Some embodiments according to the present disclosure provide a welding system that includes a field former that produces a magnetic field conforming the arc distribution evenly around the center of the weld tool axis and the consumable filler metal.

Some embodiments according to the present disclosure extend the deposition rate of strip or flat consumable electrode welding in heavy equipment manufacturing industry welding, for example, by maintaining an even arc power distribution across the strip face.

Some embodiments according to the present disclosure maintain the symmetrical distribution of the arc energy at the joint to reduce the localized energy density peak that is responsible for undercut defects in electrodes including, for example, wire consumable electrodes, strip consumable electrodes, or flat consumable electrodes in heavy fabrication welding.

Some embodiments according to the present disclosure reduce one sided melting of the strip in strip consumable submerged arc welding (SAW) and open arc strip electrode welding, for example, that might use aluminum wire in strip form.

Some embodiments according to the present disclosure employ field former technology that can include, for example, one or more magnetic or electromagnetic coils around the welding arc area to improve arc stabilization. The electromagnetic coils can be powered by any number of means including, for example, a separate power supply. The coil current can be direct current (DC) or alternating current (AC). The electromagnetic coils can be configured, for example, to generate a magnetic field to steer the welding arc emitting from a consumable or non-consumable electrode. The magnetic flux can be configured by the magnetic coil to be substantially in parallel with the welding current. The magnetic field can be configured to exert zero force on the welding arc when the welding arc is in the center of the field former. Furthermore, the magnetic field can be configured to force the welding arc back to the center of the field former if the welding arc should stray from the center.

Figure 1:
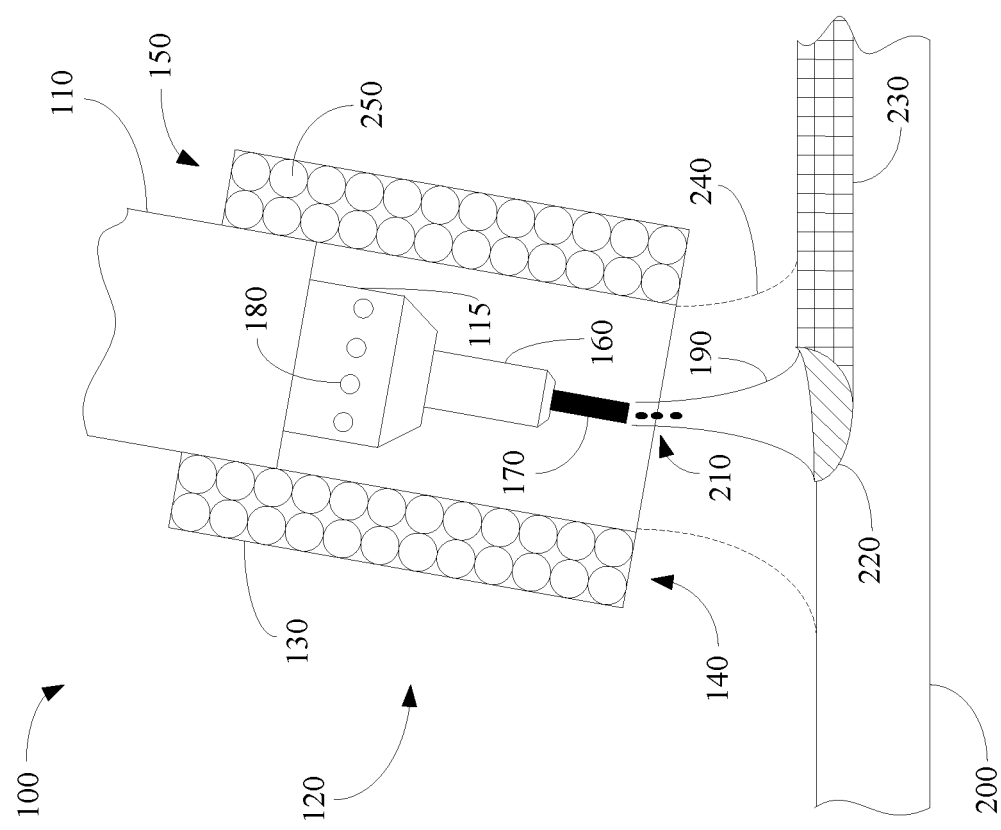
FIG. 1 shows a portion of an embodiment of a welding torch according to the present disclosure.

FIG. 1 shows a portion of an embodiment of a welding torch 100 according to the present disclosure. In some embodiments, the welding torch 100 can be connected to a welding cable that is coupled to one or more of the following: a power supply, a gas source, and a wire feeder. The welding cable provides electrical power, wire, and/or shielding gas to the welding torch 100. In some embodiments, the welding torch 100 can be, for example, a welding gun with a handle that includes a trigger that causes wire to be fed at the contact tip and an arc to form between the wire and the workpiece. The handle is connected to a neck 110 (e.g., a goose neck, a straight barrel, etc.) which connects to a gas nozzle assembly 120. The gas nozzle assembly 120 includes, for example, a gas nozzle 130 that houses a field former 140 that includes coil windings 150. A contact tip 160 extends from the gas diffuser 115 and provides the wire 170 (e.g., the consumable welding filler metal). The wire 170 receives a welding current from the contact tip 160.

In some embodiments, the welding torch 100 does not provide a consumable electrode. The welding torch 100 can be, for example, a gas tungsten arc welding (GTAW) torch, a tungsten inert gas (TIG) welding torch, or a plasma arc welding (PAW) torch. In some embodiments, instead of a contact tip, an electrode is provided. The electrode can be a non-consumable electrode such as, for example, a tungsten electrode. The electrode can be an anode or a cathode of an electric arc.

In some embodiments, the field former coil assembly 140 can be formed separate from the gas nozzle 130. For example, the field former coil assembly 140 need not be inside the housing of the gas nozzle 130. The field former coil assembly can be inside or outside the gas nozzle 130. This can be advantageous since the gas nozzle 130 can be a torch consumable that can accumulate spatter. The field former coil assembly 140 can be expensive and should not be a consumable. In some embodiments, the nozzle 130 accommodates the field former coils 250, but the exterior shell that is exposed to spatter can be replaced during routine maintenance.

During a welding operation, the wire 170 is fed through the torch neck 110, the gas diffuser 115, and the contact tip 160. Shielding as is fed through the torch neck 110 and is diffused through the gas diffuser 115 through orifices 180. An arc 190 is formed between the wire 170 and the workpiece 200 (e.g., a base metal). The arc 190 (or the voltage and/or current used to sustain the arc plasma 190) melts the wire which is deposited (e.g., as droplets 210) along the arc 190 to the workpiece 200. The arc 190 also causes a molten puddle 220 to form on the workpiece 200. As the welding torch 100 moves along the welding direction, the molten puddle cools to form a solidified weld 230. The molten puddle 220 and a portion of the solidifying weld 230 is protected by the shield gas 240.

The field former 140 integrated with the gas nozzle 130 in some embodiments includes coils that are wound around inside the gas nozzle 130. In some embodiments, the field former 140 can be a separate component or at least partially separate from the gas nozzle 130, and can be coaxial with and inside or outside of the gas nozzle 130. When current (e.g., DC current or AC current) is passed through the coils 250, a magnetic field is formed that centers the arc 190 to improve arc stability, directionality, and/or stabilize the weld process, which can ultimately improve weld quality. When the arc 190 is centered, the formed magnetic field does not substantially act on the arc 190. However, when the arc 190 drifts from center, the formed magnetic field provides a force that causes the arc 190 to return to the center of the gas nozzle 130. In some embodiments, the field former 140 maintains the arc 190 in the center of the welding torch 100 (e.g., in the center of the gas nozzle 130) despite disturbances.

In some embodiments, the gas nozzle 130 is cylindrical and the coils 250 are cylindrical electromagnetic coils that are coaxial with the contact tip 160. In some embodiments, the contact tip 160 is part of a GMAW torch or a flux-cored arc welding (FCAW) torch that employs round shaped wire for GMAW or FCAW processes.

Figure 3:
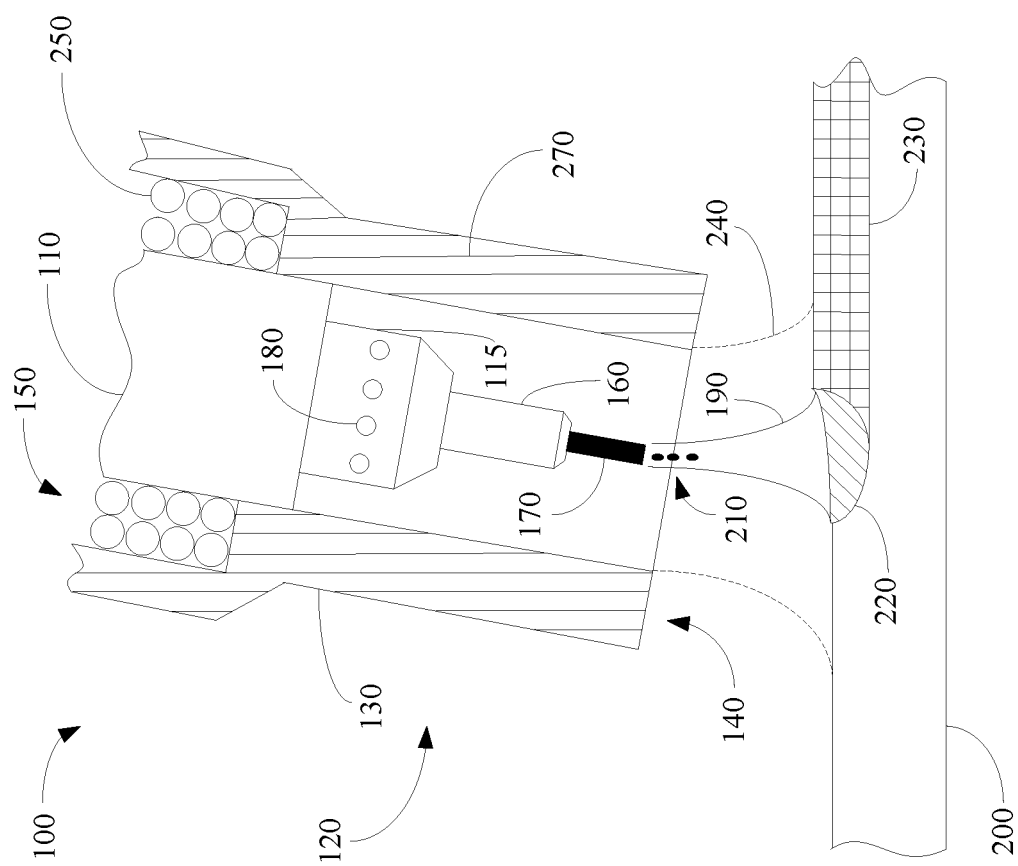
FIG. 3 shows a portion of an embodiment of a welding torch according to the present disclosure.

Some embodiments further contemplate adding ferrite-based flux concentrator to be substantially coaxial with the contact tip 160 to focus the magnetic flux around the welding consumable (e.g., the wire 170). FIG. 3 shows an embodiment of the welding torch 100 that includes a flux concentrator 270 (e.g., a ferrite material) in the gas nozzle 130. Some embodiments provide that flux concentrator 270 can be separately inside or outside of the gas nozzle 130, but still substantially coaxial with the contact tip 160 or electrode 170.

Although some embodiment contemplate consumable electrodes that use round wires, some embodiments contemplate using strip consumable electrodes in, submerged arc welding (SAW), metal inert gas (MIG), and/or metal active gas (MAG) welding torches. In certain circumstances, strip wire can be easier to feed than a large diameter round wire with the same cross sectional area. A wider arc can lead to a lower arc pressure and intensity, a decrease in penetration, and an improved gap bridging without burn-through. For example, an 8 pound/hour deposition of aluminum and 24 pound/hour deposition of steel can be achieved. In some situations, the arc can be in an elliptical shape, but can turn into a round shape at the joint.

In some embodiments, the arc is formed between the electrode and the workpiece 200. The magnetic field formed by the flow of current through the coils 250 keep the arc centered with respect to the welding torch 100, the gas nozzle 130, the contact tip 160, the electrode of the contact tip 160, or the coils 250, for example.

Figure 2:
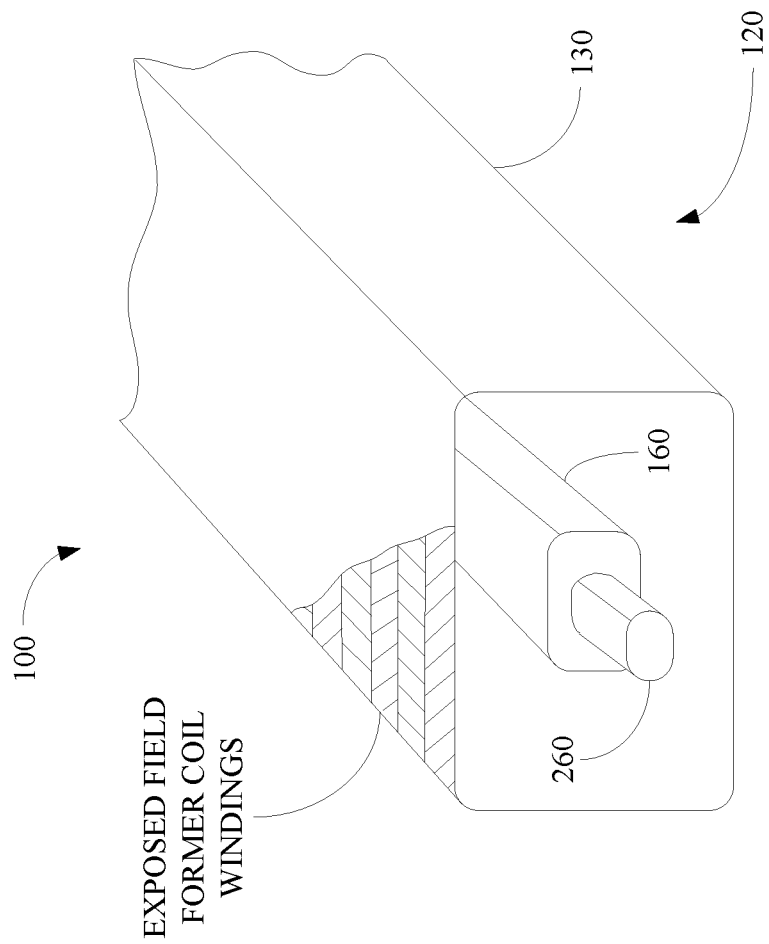
FIG. 2 shows a portion of an embodiment of the welding torch according to the present disclosure.

FIG. 2 shows a portion of another embodiment of the welding torch 100 according to the present disclosure. Referring to FIG. 2, the gas nozzle assembly 120 includes the gas nozzle 130 that is substantially racetrack shaped. The gas nozzle 130 surrounds the contact tip 160 which is a substantially rectangular. The contact tip 160 is an electrical contact tip for a strip consumable 260. In some embodiments, the strip consumable 260 has a substantially rectangular face. The welding torch 100 and the strip consumable can be used, for example, in SAW, laser-MIG hybrid, and open arc welding and hot strip cladding. The arc 190 is likely to spread across the entire end face of the strip 260 without asymmetrical burning of one side of the strip 260. The racetrack field former may spread out the arc width and minimize its energy density and base metal dilution.

One example cross-section of the strip consumable 260 is approximately 1 mm by approximately 3 mm Another example is approximately 0.5 mm by approximately 6 mm Other cross-sectional areas and aspect ratios are also contemplated by some embodiments.

Some embodiments provide that the longer axis of the strip be aligned in parallel with the joint axis to ensure root penetration. Some embodiments provide that the longer strip axis be aligned perpendicular with the joint axis for gap bridging.

Some embodiments contemplate that flux concentrator including ferrite material can be used to recess the coil away from the arc and focus the magnetic flux towards the tool center point (TCP) or center of the arc. This can reduce the overall size of the nozzle front end for better joint accessibility. In the case of a flat ribbon consumable electrode, some embodiments provide a concentrator with close proximity with the contact tip can be used to create an oval shaped flux focus.

In some embodiments, the field former is part of the gas nozzle assembly. In some embodiments, the field former is independent of the gas nozzle assembly, but is substantially coaxial with the gas nozzle assembly. The field former coils can be separate or integral with the gas nozzle, where shielding gas can pass inside or outside the coil assembly from the diffuser to the arc. Coils can be air cooled or water cooled. Coils can be made of flat, electrically conductive strips, disposed coaxially and extend longitudinally with respect to the longitudinal axis of the coil with insulation between the turns, if air cooled. Some embodiments provide that the coils can be constructed by copper tubing with water flowing there through if fluid coolant is used. The cooling of the coils may be part of the water cooling circuit of the gas nozzle.

Some embodiments contemplate combining the field former with reciprocating consumable feeding. In a non-circular shaped consumable such as a strip, the liquid metal may not be easily detached by electromagnetic pinch force off the solid strip. Reciprocating consumable feeding can be used to create periodic short circuit to dabble the molten metal into the weld pool analogous to "flat sash" paint brush to transfer wet paint from a flat brush onto an object being painted.

Some embodiments contemplate using non-circular consumable electrode that is V-shaped or S-shaped (instead of flat) consumable to add rigidity to provide feeding reliability and electrical contact to the contact tip. Other shapes are also contemplated including, for example, corrugated. The field former may be formed in the same shape to match that of the non-circular consumable electrode. In one embodiment, two contact tips (or slots, or shoes) are used to resistively preheat the electrode prior to feeding it into welding arc, being consumed by the arc, and turning into liquid. Increased rigidity can also improve arc start, electrical contact of passing the welding/cladding current, and tolerance to a stubbing recoil force despite varying temperatures, due to the preheat, of the electrode entering the contact mechanism.

Some embodiments extend the deposition rate of strip (or ribbon) consumable electrode open arc welding substantially in heavy fabrication welding by improving arc stability and spatial distribution. Previously, strip size in open arc or submerged arc strip welding was limited due to one sided burning of the strip and high power density of the arc at the joint. The magnetic field former spreads the arc wider and distributes the arc evenly across the joint overcoming the arc concentration at the joint. This prevents undercut and finger shaped penetration. This also maintains the symmetric distribution of the arc energy (matching the geometry of the electrode cross section) at the joint to reduce the localized energy density peak which is responsible for undercut defect, in strip (or ribbon) consumable electrode in surface cladding.

Some embodiments provide that, when the long axis strip is perpendicular to the joint axis, strip welding with field former can increase arc width across the joint and therefore reduce energy density and improve gap bridging capability (e.g., reduce change of burn through when the gap between sheets is present as in a lap joint, for example).

Some embodiments provide that, when the long axis strip is parallel to the joint axis, strip welding with field former may elongate the weld pool length, slow down the pool freezing time, and reduce porosity in galvanized sheet welding, or conditions that prone to porosity (such as metal oxide in the joint or primer paint).

Some embodiments reduce one sided melting of the strip in SAW welding with strip consumable.

With respect to round wire GMAW and FCAW, some embodiments stabilize the position of the arc in the center of the torch (or the joint center) with better immunity to external influences for arc wander such as surface oxide and residual magnetism of workpiece and disturbance to shielding gas flow such as wind or obstructed gas nozzle or diffuser. This can be applicable to pipe welding with a groove joint in preventing arc blow. In certain applications, the field former arc stabilizer can eliminate the additional pre-welding operation of degaussing to wipe out residual magnetism in the parts prior to welding, thereby improving productivity and reducing cost.

With respect to high deposition welding, some embodiments provide a field former that modifies pinch force field, postpones the onset of rotational spray, and stabilizes the arc at a higher wire feed speed or a higher welding current.

Some embodiments contemplate using field former technology in AC welding that avoids arc blow or arc wander.

Some embodiments provide that the field former coil is connected in series with the arc load in the welding circuit. The welding current provided by a welding power supply, for example, is also used to power the field former coil for short duration plug weld or stitch weld, for example. Mechanically, the field former coil can be constructed with round copper wire, Litz wire, or copper ribbon in a helical form that is coaxial with or wrapped around the contact tip. Electrically, the welding current passes through the field former coil before reaching the contact tip. In some embodiments, the coil ribbon also serves in heat management and has an internal channel for liquid cooling to remove heat from the torch nozzle. This can simplify the power circuits and the torch and can reduce cost.

Some embodiments contemplate that the field former coil is part of an automation torch to be held by a robot, a carriage, a gantry, a bug, a side-beam, a seamer, a tractor, etc.

Some embodiments contemplate that the field former coil assembly is an add-on to an existing arc welding system, a cladding system, a brazing system, a cutting torch system. The add-on or accessory system includes, for example, one or more of the following: one or more coil windings through which flows current that forms a magnetic field concentric with the arc; a power supply to deliver the current needed to generate the magnetic field; sufficient controls to synchronize the magnetic field generation with the arc power generation; a crowbar self-protection circuit (e.g., protection circuit against a short circuit in the coil or cable); programmable field strength commensurate with the arc current; and cables to interconnect the magnetic field power supply and the coil(s).

Some embodiments contemplate that the welding torch is part of or includes, for example, a GMAW torch, an FCAW torch, a GTAW torch, a TIG torch, a SAW torch, and/or a metal-core arc welding (MCAW) torch.

Some embodiments provide that the current flowing through a cross section of one or more coil windings is substantially perpendicular to an arc current. Some embodiments provide that the one or more coil windings are substantially coaxial with a welding current through an electrode or a contact tip of a welding torch. Some embodiments provide that the one or more coil windings are wound around a longitudinal axis of a welding torch. Some embodiments provide that the one or more coil windings are disposed in or in proximity to a welding torch head.

While the present apparatuses, systems, and/or methods have been described with reference to certain implementations, it will be understood by those skilled in the art that various changes may be made and equivalents may be substituted without departing from the scope of the present apparatuses, systems, and/or methods. In addition, many modifications may be made to adapt a particular situation or material to the teachings of the present disclosure without departing from its scope. Therefore, it is intended that the present apparatuses, systems, and/or methods not be limited to the particular implementations disclosed, but that the present apparatuses, systems, and/or methods will include all implementations falling within the scope of the appended claims.

What is claimed is:

1. A welding torch, comprising:
   a gas nozzle;
   one or more coil windings configured to conduct current to form a magnetic field; and
   an electrode configured to provide an arc,
   wherein the gas nozzle defines an end closest to the arc through which shielding gas is directed towards a workpiece, the one or more coil windings are integrated into the gas nozzle and extend to the end of the gas nozzle closest to the arc,
   wherein the arc is formed between the electrode and the workpiece,
   wherein the magnetic field forces the arc in a center of the welding torch, and
   wherein the current flowing through a cross section of the one or more coil windings is perpendicular to an arc current.

2. The welding torch according to claim 1, wherein the one or more coil windings are coaxial with a welding current through the electrode.

3. The welding torch according to claim 1, wherein the electrode is a consumable electrode configured to receive a welding current from a contact tip.

4. The welding torch according to claim 3, wherein the contact tip and the one or more coil windings are axially aligned.

5. The welding torch according to claim 1, wherein the electrode is a non-consumable electrode.

6. The welding torch according to claim 1, wherein the electrode includes a round-wire consumable electrode.

7. The welding torch according to claim 1, wherein the electrode includes a strip consumable electrode.

8. The welding torch according to claim 7, wherein the magnetic field is configured so that the arc is focused at a center of an end face of the strip consumable electrode.

9. The welding torch according to claim 1, wherein the welding torch is configured to receive a contact tip, and wherein the contact tip and the electrode are cylindrical in shape.

10. The welding torch according to claim 1, wherein the welding torch is configured to receive a contact tip, and wherein the contact tip and the electrode have a cross section that is rectangular in shape.

11. The welding torch according to claim 1, wherein the electrode includes a consumable electrode, and wherein the arc consumes the consumable electrode producing droplets that are deposited along the arc to the workpiece.

12. The welding torch according to claim 1, wherein the current is alternating current or direct current.

13. The welding torch according to claim 1, wherein the welding torch includes a gas metal arc welding (GMAW) torch, a flux-cored arc welding (FCAW) torch, a gas tungsten arc welding (GTAW) torch, a tungsten inert gas (TIG) welding torch, a metal-core arc welding (MCAW) torch, or a submerged arc welding (SAW) torch.

14. The welding torch according to claim 1, wherein the magnetic field forces the arc back to the center if the arc strays from the center.

15. The welding torch according to claim 1, wherein the electrode includes a strip consumable electrode.

16. The welding torch according to claim 1, where the welding torch is an automation torch configured to be held by one of a robot, a carriage, a gantry, a bug, a side-beam, a seamer, and a tractor.

17. A welding system, comprising:
    a welding torch that is configured to receive an electrode and one or more coil windings, the welding torch including a gas nozzle,
    wherein the one or more coil windings are axially aligned with the electrode and through which current flows to form a magnetic field,
    wherein an arc is formed between the electrode and a workpiece,
    wherein the gas nozzle defines an end closest to the arc through which shielding gas is directed towards the workpiece, the one or more coil windings are integrated into the gas nozzle and extend to the end of the gas nozzle closest to the arc,
    wherein the magnetic field forces the arc in a center of the one or more coil windings, and
    wherein the current flowing through a cross section of the one or more coil windings is perpendicular to an arc current.

18. The welding system according to claim 17, wherein the one or more coil windings are coaxial with a welding current through the electrode.

19. The welding system according to claim 17, wherein the electrode includes a consumable round wire or a strip consumable electrode.

20. The welding system according to claim 17, wherein the electrode is a strip consumable electrode and the magnetic field is configured so that the arc is focused an end face of the strip consumable electrode.

21. The welding system according to claim 17, wherein the one or more coil windings are coiled in a cylindrical shape around the electrode, and wherein the electrode is cylindrical in shape.

22. The welding system according to claim 17, wherein the one or more coil windings are coiled in a rectangular shape around the electrode, and wherein end faces of the electrode are rectangular in shape.

23. The welding system according to claim 17, wherein the welding torch includes a gas metal arc welding (GMAW) torch, a flux-cored arc welding (FCAW) torch, gas tungsten arc welding (GTAW) torch, a tungsten inert gas (TIG) welding torch, a metal-core arc welding (MCAW) torch, or a submerged arc welding (SAW) torch.

24. The welding system according to claim 17, wherein the magnetic field forces the arc back to the center if the arc is disturbed from the center.

25. A method of welding, comprising:
forming an arc from an electrode to a workpiece via a welding torch;
generating a magnetic field via a coil winding within a gas nozzle of the welding torch, wherein the gas nozzle defines an end closest to the arc through which shielding gas is directed towards the workpiece, and the coil winding is axially aligned with the electrode and extends to the end of the gas nozzle that is closest to the arc;
flowing the current through a cross section of the one or more coil windings that is perpendicular to an arc current; and
forcing, by the magnetic field, the arc back to a particular position when the arc strays from the particular position.

26. The method according to claim 25, wherein the electrode includes a round-wire consumable electrode or a strip consumable electrode.

27. The welding torch according to claim 1, wherein the gas nozzle includes a replaceable exterior shell.

28. The welding system according to claim 17, wherein the gas nozzle includes a replaceable exterior shell.

29. The method according to claim 25, wherein the gas nozzle includes a replaceable exterior shell.

* * * * *